United States Patent Office

2,760,913
Patented Aug. 28, 1956

2,760,913

CATALYTIC CRACKING AND REGENERATION OF CATALYST

Alfred R. Vander Ploeg, Port Arthur, Tex., assignor to The Texas Company, New York, N. Y., a corporation of Delaware No Drawing. Application January 22, 1951,
Serial No. 207,234

2 Claims. (Cl. 196—52)

This invention relates to the catalytic cracking of hydrocarbon oils for the production of lower boiling products such as gasoline or motor fuel and is concerned with certain improvements in the processing of different types of charging stocks and in the regeneration of the catalyst. More particularly, the invention is concerned with certain improvements involved in the processing of metal contaminated charging stocks.

In the catalytic cracking processes coke is deposited on the active surfaces of the catalyst and the catalyst is reactivated by burning of the deposited coke. When stocks containing certain metal contaminants are processed a deposition of the metal contaminants takes place on the active surfaces of the catalyst. In the regeneration by burning of the deposited coke the metal contaminant deposits are not removed or at least are only partially removed with the result that as the regenerated catalyst is re-used there is a build-up of contaminants on the active surfaces of the catalyst which causes reduction in the cracking activity of the catalyst and poor product distribution marked particularly by increased gas and coke formation. Thus, for example, iron, nickel and vanadium constituents contained in the charging stock become deposited on the active catalyst surfaces and function to reduce the catalyst activity as regards conversion into gasoline while at the same time promoting undesirable dehydrogenating reactions resulting in increased formation of gas and coke. It has been found difficult indeed to effect the complete removal of these metal contaminants from the oil and the trouble is that even small amounts of the contaminants in the oil are very harmful in the catalytic cracking operation.

The invention contemplates the processing of these metal contaminated stocks. In accordance with the invention the contaminated stocks are segregated from the uncontaminated stocks and the stocks are processed alternately in a novel manner associated with certain regenerating steps.

As stated, the ordinary regeneration of the catalyst does not prevent the accretion of the metal contaminants on the active surfaces of the catalyst but the discovery has now been made that a regeneration of such severity as to produce a material deactivation of the catalyst and such as to alter the structure of the catalyst operates to effectively reduce the undesirable action of the contaminants. It appears that under sufficiently drastic conditions there is a reformation of the catalyst structure; there is a collapsing of the catalyst structure in which the surface deposits are occluded in the body of the catalyst. The pore volume decreases and the catalyst becomes more dense. Thus while the result is to decrease somewhat the desired catalytic cracking activity of the catalyst there is, on the other hand, a very material covering up or masking of the contaminant constituents and a pronounced reduction in the undesirable activities thereof.

By way of example as indicating the effect of the severe regeneration or deactivation contemplated by the invention, a catalyst may be impregnated with iron and the catalyst then steam deactivated. When using the catalyst thus treated for catalytic cracking it is found that the iron has no material effect on gas and carbon producing tendencies, showing that the iron contaminant has, by the deactivation, been largely removed from the active surfaces of the catalyst and occluded within the body of the catalyst where it does no harm. On the other hand, if the catalyst is steam deactivated and iron is deposited on the surface of the deactivated catalyst, there is a marked effect on the gas and carbon producing tendencies.

The invention is concerned with the organo metallic compounds present in the oil which become deposited on the active surfaces of the catalyst and involves the altering of the catalyst structure so as to remove the deposited contaminants from the active surfaces and occlude them within the catalyst. So long as the contaminant is not present on the active catalytic surfaces it does no harm. Thus, for example, it is quite common for the natural silica-alumina or clay catalysts to contain very considerable proportions of iron without affecting the selectivity of the catalyst since the amount of surface iron is negligible.

In accordance with the invention the contaminated stock and uncontaminated stock are charged alternately with severe regeneration and resultant occlusion of the deposited contaminants in the catalyst following the charging of the contaminated stock. Thus, the contaminated stock is subjected to catalytic cracking with resultant deposition of coke and contaminants on the catalyst and with normal regeneration and re-use of the regenerated catalyst. This operation is conducted for a period during which there is a progressive loss in catalyst activity as regards conversion into gasoline and increased tendency to gas and coke production due to the build-up of the contaminants on the catalysts. The charging stock is then changed to an uncontaminated stock and the catalyst is subjected to severe regeneration of such extent as to effect a deactivation of the catalyst and occlusion of contaminants in the catalyst. The charging of the uncontaminated stock is then continued and normal regeneration is resumed.

The contaminants with which the present invention is concerned are the organo metallic compounds which are present in crude petroleum, especially compounds of iron, nickel, vanadium and chromium. The inorganic salts which are also found in crude petroleum are also harmful to catalyst activity but these salts when present can readily be removed by de-salting processes. The organo metallic compounds, on the other hand, are not completely removed by the ordinary treating processes. These compounds are volatilizable and thus in the usual refinery distilling processes, the contaminants are present in overhead stocks such as gas oil which it is desired to use as charging stocks for catalytic cracking. The effect of the various contaminants on the selectivity of the catalyst can be determined. Thus, for example, the relative effectiveness of $Cr_2O_3$, $NiO$, $Fe_2O_3$ and $V_2O_5$ on increasing the carbon producing factor is $$\frac{1}{0.6} : 1 : \frac{1}{1.5} : \frac{1}{1.5}$$

and the relative effectiveness on increasing gas and hydrogen factors is $$\frac{1}{0.6} : 1 : \frac{1}{1.5} : \frac{1}{0.94}$$

A stock which contains only a very small amount of any of the organo metallic compounds is unsatisfactory for use as a catalytic cracking feed stock. In general the presence of as little as 1 p. p. m. (part per million) of contaminant in a charge stock is definitely harmful in
} the catalytic cracking operation and for the purposes of the present invention a stock containing 1 p. p. m. or more of contaminant is considered a contaminated stock and an uncontaminated stock is one that contains less than 1 p. p. m. of contaminant. It has been determined that even such a low concentration of contaminant as 1 p. p. m. in the charge stock will result in excessive gas and carbon production in fluid catalytic cracking when running until equilibrium is reached at a constant catalyst addition rate and when the concentration of contaminant in the charging stock is as low as 0.1 p. p. m the effect of the contaminant is negligible. In these particular determinations the figures were based on nickel and vanadium as oxides. Thus, to be considered as an uncontaminated stock the concentration of contaminants in such stock should not exceed a few tenths p. p. m.

The reformation of the catalyst structure to occlude the contaminants in the body of the catalyst is accomplished by high temperature regeneration as well as by steam in large volume. The actual temperature required to alter the catalyst structure and increase its density sufficiently to effect the desired occlusion will vary somewhat with the particular catalyst used since catalysts vary as to resistance to heating and steam. Having in mind the ordinary silica-alumina catalysts in current use in the industry, these catalysts will stand regeneration temperatures as high as about 1100° F. or possibly 1125° F. without any material reformation of the catalyst structure. The regeneration may be accompanied with moderate quantities of steam in the flue gas such as 10% by volume without effecting reformation of the catalyst structure. In order to accomplish the severe regeneration desired to effect the reformation of the catalyst structure and occlusion of the deposited contaminants the regeneration is conducted at temperatures of 1150° F. and higher and it is advantageous to use in this regeneration increased quantities of steam such as a volume of 50%.

The present invention is adapted for use in various types of catalytic cracking such as fixed bed, moving bed and fluid type catalytic cracking. It is especially advantageous in those operations in which the catalyst in motion is contacted with the hydrocarbon, the catalyst separated from the reaction products, regenerated in a separating zone and recycled to the cracking zone. These operations are typical of moving bed and fluid type catalytic cracking.

In a typical operation in accordance with the invention, the charging stock is contacted with fluidized catalyst, the catalyst regenerated and recycled and contaminated and uncontaminated stocks are alternately charged to the system with severe regeneration following the charging of the contaminated stock.

Thus, by way of example in such operation, a contaminated stock is charged and the catalyst is regenerated in a normal manner at temperatures not over 1125° F. and without steam or at least with not over about 10% of steam which may be present in the flue gas due to the combustion of hydrogen in the coke on the catalyst and the entrainment of steam in the catalyst as it comes from the spent catalyst stripper. The regenerated catalyst is recycled and fresh catalyst is regularly added in a normal manner. This operation is continued for a period and it is marked by reduction in the selectivity of the catalyst due to the deposition of the contaminants on the catalyst. The charging stock is then changed to an uncontaminated stock, and the catalyst regenerating conditions are altered, the temperature being raised to 1150° or higher with preferably some 50% by volume of steam being used in the regenerating gas. There is preferably no addition of fresh catalyst during this period but recycling of the severely regenerated catalyst is conducted. This period of severe regeneration is continued for a relatively short time. The severe regeneration deactivates the catalyst and produces a collapsing or reformation of the structure by which the deposited contaminants are occluded in the catalyst body and thus removed from the active surfaces. Usually a severe regeneration of some 12–72 hours will be found adequate to effect this reformation of the catalyst structure. Following this period of severe regeneration normal regenerating conditions are re-established while continuing to charge uncontaminated stock. In other words, the temperature of regeneration is reduced so as not to exceed about 1100° F. or 1125° F. and the amount of steam is reduced to about 10% or below. The addition of fresh catalyst to the system is resumed and the regenerated catalyst is recycled. This operation is marked by a progressive increase in catalyst activity due to the continued addition of fresh catalyst. The operation is continued for an extended period of time such as a matter of months or until it is desirable to utilize contaminated charging stock whereupon the cycle of operations described herein is again resumed with the charging of the contaminated stock.

In reference to the length of time for charging the contaminated stock, it is recommended that the time be limited so as not to exceed that required to reach a concentration of contaminants on the catalyst of about 1000 p. p. m. NiO equivalents or to a carbon-producing factor of about 2. The quantity of contaminants in charging stocks varies considerably and the build-up of contaminants on the catalyst will vary greatly with different stocks. By way of example, in fluid catalytic cracking operations a charging stock containing 10 p. p. m. of contaminants may cause an accumulation of contaminants on the catalyst amounting to 1000 p. p. m. NiO equivalents in about 25 days, while with a charging stock containing 5 p. p. m. of contaminants the build-up of contaminants on the catalyst will be considerably slower so that a concentration of 1000 p. p. m. on the catalyst may not be reached until some 60 days. Various other factors will influence the length of time applied to the use of the contaminated stock, such for instance as the relative amounts of contaminated and uncontaminated stocks available.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the catalytic cracking of hydrocarbon oils for the production of motor fuel, the process that comprises contacting a stock contaminated with organo metallic compounds of the nature of chromium, nickel, iron and vanadium compounds with solid cracking catalyst at cracking temperature with resultant deposition of coke and contaminants on the catalyst, subjecting the catalyst to normal regeneration by burning of deposited coke at temperatures not over 1125° F. and with not more than about 10% steam in the regeneration gas and reusing the regenerated catalyst in the process, continuing such operations for a period with resultant alteration in the selectivity of the catalyst leading to increased formation of coke and gas due to the presence of the contaminants on the catalyst, then substituting an uncontaminated stock for such contaminated stock and substituting for the normal regeneration a catalyst deactivating operation in which the catalyst is subjected to regeneration at a temperature of the order of 1150° F. in the presence of the order of 50% by volume of steam in the regenerating gas for a period of 12 to 72 hours to effect alteration of the catalyst structure so as to occlude deposited contaminants within the catalyst and reduce the pore volume and increase the density of the catalyst, thereafter resuming normal regeneration at temperatures not over 1125° F. and with not more than about 10% steam in the regeneration gas and continuing the operation for an extended period.

2. In the catalytic cracking of a hydrocarbon oil contaminated with organo metallic compounds of the nature of chromium, nickel, iron and vanadium for the production of motor fuel, the process that comprises contacting a stock contaminated with organo metallic compounds of the nature of chromium, nickel, iron and vanadium compounds with solid cracking catalyst at cracking temperature with resultant deposition of coke and contaminants on the catalyst; subjecting the catalyst to normal regeneration by burning of deposited coke at temperatures not over 1125° F. and with not more than about 10% steam in the regeneration gas and reusing the regenerated catalyst in the process; continuing such operations for a period with resultant alteration in the selectivity of the catalyst leading to increased formation of coke and gas due to the presence of the contaminant on the catalyst; then substituting for the normal regeneration a catalyst deactivation operation in which the catalyst is regenerated at a temperature of the order of 1150° F. in the presence of the order of 50% by volume of steam in the regenerating gas for a period of 12 to 72 hours effecting alteration of the catalyst structure, occlusion of deposited contaminants in the body of the catalyst and resultant increase in the selectivity of the catalyst; and thereafter resuming normal regeneration at temperatures not over 1125° F. and with not more than about 10% steam in the regeneration gas, and continuing the operation for an extended period.

References Cited in the file of this patent

UNITED STATES PATENTS

| | | |
|---|---|---|
| 2,143,364 | Taylor | Jan. 10, 1939 |
| 2,300,878 | Drennan et al. | Nov. 3, 1942 |
| 2,504,102 | Sorf | Apr. 18, 1950 |
| 2,614,068 | Healy et al. | Oct. 14, 1952 |

OTHER REFERENCES

"Aging of Cracking Catalyst" by G. A. Mills, Ind. & Eng. Chem., vol. 42, No. 1, January 1950. Pages 182–187.